United States Patent
Patil et al.

(10) Patent No.: US 10,438,350 B2
(45) Date of Patent: Oct. 8, 2019

(54) MATERIAL SEGMENTATION IN IMAGE VOLUMES

(71) Applicant: General Electric Company, Schenectady, NY (US)

(72) Inventors: Bhushan Dayaram Patil, Bangalore (IN); Peter Lamb, Niskayuna, NY (US); Roshni Rustom Bhagalia, Niskayuna, NY (US); Bipul Das, Bangalore (IN)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 15/634,657

(22) Filed: Jun. 27, 2017

(65) Prior Publication Data
US 2018/0374209 A1 Dec. 27, 2018

(51) Int. Cl.
*G06K 9/00* (2006.01)
*G06T 7/00* (2017.01)
*G06T 7/11* (2017.01)

(52) U.S. Cl.
CPC ............ *G06T 7/0012* (2013.01); *G06T 7/11* (2017.01); *G06T 2207/10081* (2013.01); *G06T 2207/20081* (2013.01); *G06T 2207/20084* (2013.01); *G06T 2207/30008* (2013.01)

(58) Field of Classification Search
None
See application file for complete search history.

(56) References Cited

U.S. PATENT DOCUMENTS

| | | | | |
|---|---|---|---|---|
| 5,984,870 A | * | 11/1999 | Giger | G06T 7/0012 600/443 |
| 6,744,911 B1 | | 6/2004 | Avila et al. | |
| 8,094,906 B2 | | 1/2012 | Porat et al. | |
| 8,588,498 B2 | | 11/2013 | Novak et al. | |
| 9,495,752 B2 | | 11/2016 | Wu et al. | |
| 2005/0207630 A1 | | 9/2005 | Chan et al. | |
| 2010/0124364 A1 | * | 5/2010 | Huo | G06T 7/0012 382/128 |

(Continued)

FOREIGN PATENT DOCUMENTS

CN 105590319 A 5/2016

OTHER PUBLICATIONS

Hofmann, Matthias, et al.; "MRI-Based Attenuation Correction for Whole-Body PET/MRI: Quantitative Evaluation of Segmentation- and Atlas-Based Methods", The Journal of Nuclear Medicine, vol. 52, No. 9, pp. 1392-1399, Sep. 1, 2011.

(Continued)

*Primary Examiner* — Atiba O Fitzpatrick (57) ABSTRACT

The present approach relates, in some aspects, to a multi-level and a multi-channel frame work for segmentation using model-based or "shallow" classification (i.e. learning processes such as linear regression, clustering, support vector machines, and so forth) followed by deep learning. This framework starts with a very low resolution version of the multi-channel data and constructs an shallow classifier with simple features to generate a coarser level tissue mask that in turn is used to crop patches from the high-resolution volume. The cropped volume is then processed using the trained convolution network to perform a deep learning based segmentation within the slices.

14 Claims, 5 Drawing Sheets

(56) References Cited

U.S. PATENT DOCUMENTS

| | | |
|---|---|---|
| 2011/0188706 A1 | 8/2011 | Zhou |
| 2012/0143037 A1 | 6/2012 | Najarian et al. |
| 2014/0086465 A1 | 3/2014 | Wu et al. |
| 2014/0093153 A1 | 4/2014 | Sofka et al. |
| 2016/0015347 A1 | 1/2016 | Bregman-Amitai et al. |
| 2016/0110632 A1 | 4/2016 | Kiraly et al. |
| 2016/0328855 A1 | 11/2016 | Lay et al. |

OTHER PUBLICATIONS

Sjolund, Jens, et al.; "Skull Segmentation in MRI by a Support Vector Machine Combining Local and Global Features", 22nd International Conference on Pattern Recognition, pp. 3274-3279, Aug. 24-28, 2014.

"Personalized 3D Bone Segmentation", Scyfer, http://scyfer.nl/portfolio/fiche-personalized-3d-bone-segmentation/, 2016.

* cited by examiner

MATERIAL SEGMENTATION IN IMAGE VOLUMES

BACKGROUND

The subject matter disclosed herein relates to image reconstruction, and in particular to the use of machine learning techniques, such as deep learning, to segment bone, tissue or other types of materials in derived images.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through the target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

Certain imaging techniques may be employed for imaging particular structures and/or obtaining particular types of anatomical or physiological information. By way of example, computed tomography (CT) angiography is a technique employed for imaging the vasculature of a patient. It is typically desirable to remove bone from the reconstructed images to allow an unobstructed view of the vascular tree. Such bone removal operations, however, may be difficult due to the contrast agents employed in the vascular imaging process rendering the imaged vessels highly radio opaque, much like the bone structures to be removed from the final images.

In particular, traditional segmentation approaches use adaptive thresholding in a joint histogram domain of the multi-channel data to solve the problem of bone segmentation from CT data. In this process, features like mean, standard deviation, and so forth are needed for the threshold selection. However, overlapping intensity values of tissue and bone, such as due to the use of a contrast agent in the vasculature, may lead to misclassification using this method due to overlapping intensity values.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In certain aspects, the present approach includes a multi-step (e.g., two-step) automated procedure for segmenting bone from an imaged volume (e.g., a CT volume). In one embodiment, a cascade method is employed using model-based or "shallow" classification (i.e. geometric models, Bayesian inference and/or learning processes such as linear regression, clustering, support vector machines, and so forth) to pre-classify bone regions and deep learning techniques for automatic bone segmentation to generate a high-resolution bone mask using the pre-classified data to speed processing by limiting the region of data analyzed.

In one embodiment, a method is provided. In accordance with this method, multi-channel measurement data is obtained from an imaging scanner. All or a portion of the multi-channel measurement data is processed using a trained neural network. The trained neural network outputs a set of two or more-dimensional single-channel bone (or other tissue) maps. A bone (or other tissue) mask is generated using the set of single-channel bone (or other tissue) maps. The bone (or other tissue) mask or a bone-free (or other tissue-free) volume derived using the bone (or other tissue) mask is displayed.

In a further embodiment, an image processing system is provided. In accordance with this embodiment, the image processing system comprises a processing component configured to execute one or more stored processor-executable routines and a memory storing the one or more executable-routines. The one or more executable routines, when executed by the processing component, cause acts to be performed comprising: obtaining multi-channel measurement data from one or more imaging scanners; co-registering the multi-channel data if not registered; processing all or a portion of the multi-channel measurement data using a trained neural network, wherein the trained neural network outputs a set of two or more-dimensional single-channel bone (or other tissue) maps; generating a bone (or other tissue) mask using the set of single-channel bone (or other tissue) maps; and displaying the bone (or other tissue) mask or a bone-free (or other tissue-free) volume derived using the bone (or other tissue) mask.

In an additional embodiment, one or more non-transitory computer-readable media encoding processor-executable routines are provided. In accordance with this embodiment, the routines, when executed by a processor, cause acts to be performed comprising: obtaining multi-channel measurement data from an imaging scanner; processing all or a portion of the multi-channel measurement data using a trained neural network, wherein the trained neural network outputs a set of two or more-dimensional single-channel bone (or other tissue) maps; generating a bone (or other tissue) mask using the set of two or more -dimensional single-channel bone (or other tissue) maps; and displaying the bone (or other tissue) mask or a bone-free (or other tissue-free) volume derived using the bone (or other tissue) mask.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure While aspects of the following discussion are provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context or image processing field where a set or type of acquired data undergoes a reconstruction process to generate an image or volume.

Furthermore, while the following discussion focuses on standard images or image volumes, it should be understood that the same approach can also be applied to sets of images or image volumes corresponding to different aspects of the scan. For example, spectral CT produces a set of images, including monochromatic images at different energies as well as basis material decomposition images, some or all of which may benefit from the present approach. Further, though CT and C-arm angiography examples are primarily provided herein, it should be understood that the present approach may be used in other imaging modality contexts where tomographic reconstruction and material segmentation processes are employed. Indeed, data acquired in multi-modality contexts may be processed using the present approach, such as data acquired CT or other possibly multi-dimensional scanners, such as C-arms, magnetic resonance imaging (MRI), ultrasound, and so forth.

The present approach addresses certain challenges associated with bone (or other material or tissue) segmentation in images using a multi-level approach. For example, in one embodiment, a two-step automated procedure is employed for segmenting bone from a reconstructed CT volume. This allows bone to be removed from the visualization of contrast-enhanced CT images, allowing a view of the vasculature without interference from bone structures otherwise in the view. In one such implementation, a support vector machine (SVM) based pre-classification is employed to generate an initial bone mask that is then used to determine the image regions processed using deep learning techniques, which generate a higher resolution bone mask. Though bone maps and masks are discussed herein by way of example, it is to be understood that the present approach may be generalized to other tissues, and thus more generally to tissue maps and tissue masks where appropriate. Thus, though bone segmentation may be presented by way of example herein, one skilled in the art will apprehend the extension more generally to segmentation of any suitable tissue using tissue maps and masks as discussed herein.

In an implementation, a multi-channel (e.g., dual-energy, multi-energy, or multi-modality) input is envisioned, such as a co-registered dual input associated with a spectral imaging implementation. In such an approach, the multi-channel inputs provide complementary information which may improve segmentation. Output may be a single output binary channel, such as a single channel bone-mask. With respect to the deep learning aspects, different types of deep learning architectures may be employed which may vary in the number of layers, filters, and so forth. A suitable architecture may be designed or selected based on the desired segmentation speed and/or accuracy. One example of a suitable deep learning architecture is a U-Net deep learning architecture.

With the preceding introductory comments in mind, some embodiments of the approaches described herein utilize neural networks as part of the reconstruction process used to generate material segmented tomographic images, such as CT or C-arm angiography images. Neural networks as discussed herein may encompass deep neural networks, fully connected networks, convolutional neural networks (CNNs), perceptrons, auto encoders, recurrent networks, wavelet filter banks, or other neural network architectures. These techniques are referred to herein as deep learning techniques, though this terminology may also be used specifically in reference to the use of deep neural networks, which is a neural network having a plurality of layers. With respect to the present approach, certain deep learning architectures, such as U-Net, V-Net or deep contextual networks may be employed.

As discussed herein, deep learning techniques (which may also be known as deep machine learning, hierarchical learning, or deep structured learning) are a branch of machine learning techniques that employ mathematical representations of data and artificial neural network for learning. By way of example, deep learning approaches may be characterized by their use of one or more algorithms to extract or model high level abstractions of a type of data of interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data.

In general, the processing from one representation space to the next-level representation space can be considered as one 'stage' of the reconstruction process. Each stage of the reconstruction can be performed by separate neural networks or by different parts of one larger neural network. For example, as discussed herein, a single deep learning network may cover all stages in a reconstruction process (e.g., from an initial input to an output image (such as a reconstructed image)). Alternatively, separate distinct deep learning network(s) may each cover only one stage (or a subset of stages) of the overall reconstruction process. For example, in the present context, such a single stage may be from an initial input to an intermediate representation, from one intermediate image or representation to another, or from an intermediate image or representation to an output, and so forth.

As part of the initial training of deep learning processes to solve a particular problem, training data sets may be employed that have known initial values (e.g., input images, projection and/or spectral data, and so forth) and known or desired values for a final output (e.g., reconstructed tomographic reconstructions, a segmented bone volume, a vascular tree volume from which the bone has been segmented, and so forth) of the deep learning process. The training of a single stage may have known input values corresponding to one representation space and known output values corresponding to a next-level representation space. In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

With this in mind, in one implementation of the present approach a convolutional network training step may use multi-channel (i.e., two or more channel) data as input data and corresponding single channel tissue map, such as bone masks (e.g., manually created bone masks) as the ground truth image. The trained network may include multiple upsampling and downsampling layers, allowing multi-scale tissue classification from a multi-parametric acquisition. In accordance with this approach, the trained network may receive as inputs co-registered multi-channel acquisition data, such as images corresponding to different X-ray energies or spectra, and may perform multi-scale tissue classification based on this input data. Such an approach allows, in the training context, information from more than one channel to be used to learn tissue properties, thereby improving tissue classification. Further, the layers at different resolutions (i.e., downsampled and upsampled spaces) allows image voxel properties to be learned at different scales, reducing the corresponding search space and speeding classification. A deep learning approach implemented as discussed herein allows higher dimensional features, which have a high discriminative capabilities, to be derived which outperform lower dimensional features conventionally used for segmentation. Further, misclassification errors due to overlapping intensity values (such as between contrast agent and bone) are minimized by learning not only the intensity variations but also the structural information of the multi-channel and multi-dimensional data.

By way of example, in one contemplated implementation, supervised training of the neural network utilizes pairs of ground truth images, the corresponding sinograms, and/or transforms of the corresponding sinograms, some or all of which may include using different X-ray energies or spectra, as from a dual-energy acquisition.

Figure 1:
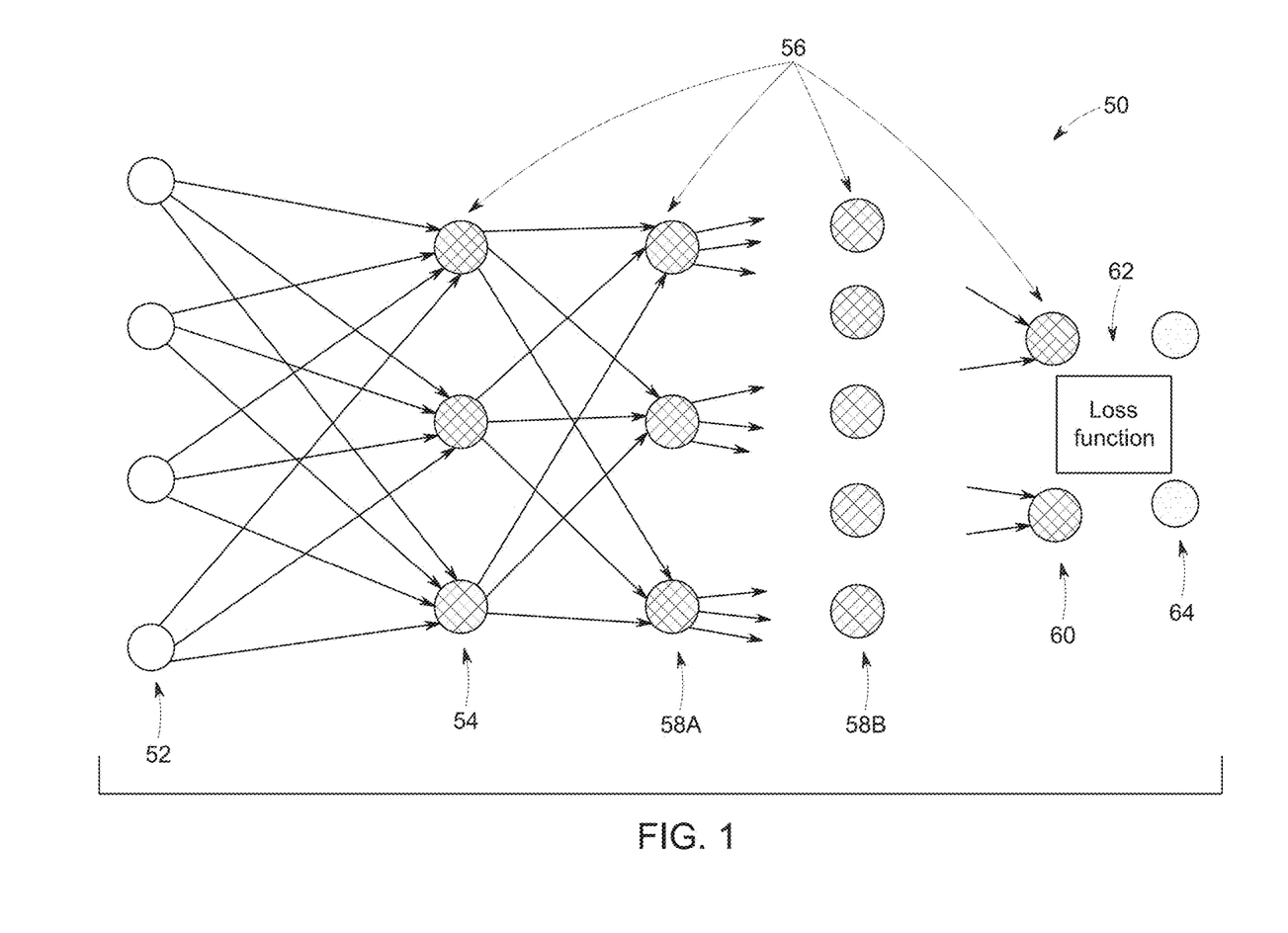
FIG. 1 depicts an example of an artificial neural network for training a deep learning model, in accordance with aspects of the present disclosure.

With the preceding in mind, FIG. 1 schematically depicts an example of an artificial neural network 50 that may be trained as a deep learning model as discussed herein. In this example, the network 50 is multi-layered, with a training input 52 and multiple layers including an input layer 54, hidden layers 58A, 58B, and so forth, and an output layer 60 and the training target 64 present in the network 50. Each layer, in this example, is composed of a plurality of "neurons" or nodes 56. The number of neurons 56 may be constant between layers or, as depicted, may vary from layer to layer. Neurons 56 at each layer generate respective outputs that serve as inputs to the neurons 56 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 60 (e.g., predicted image) which, in conjunction with a target image 64, are used to compute some loss or error function 62, which will be backpropagated to guide the network training.

The loss or error function 62 measures the difference between the network output (i.e., a diagnostic image, bone mask or volume, bone segmented vascular tree) and the training target. In certain implementations, the loss function may be the mean squared error (MSE) of the voxel-level values or partial-line-integral values and/or may account for differences involving other image features, such as image gradients or other image statistics. Alternatively, the loss function 62 could be defined by other metrics associated with the particular task in question, such as a softmax function.

With the preceding in mind, the neural network 50 may be trained for use in bone (or other material) segmentation for use in tomographic reconstruction as discussed herein. In a training example, the neural network 50 may first be constrained to be linear (i.e., by removing all non-linear units) to ensure a good initialization of the network parameters. After pre-training, the neural network 50 may be trained as a whole and further incorporate non-linear units.

To facilitate explanation of the present tomographic reconstruction approach using deep learning techniques, the present disclosure primarily discusses these approaches in the context of a CT or C-arm system. However, it should be understood that the following discussion may also be applicable to other imaging modalities and systems, as well as to non-medical contexts or any context where tomographic reconstruction is employed to reconstruct an image.

Figure 2:
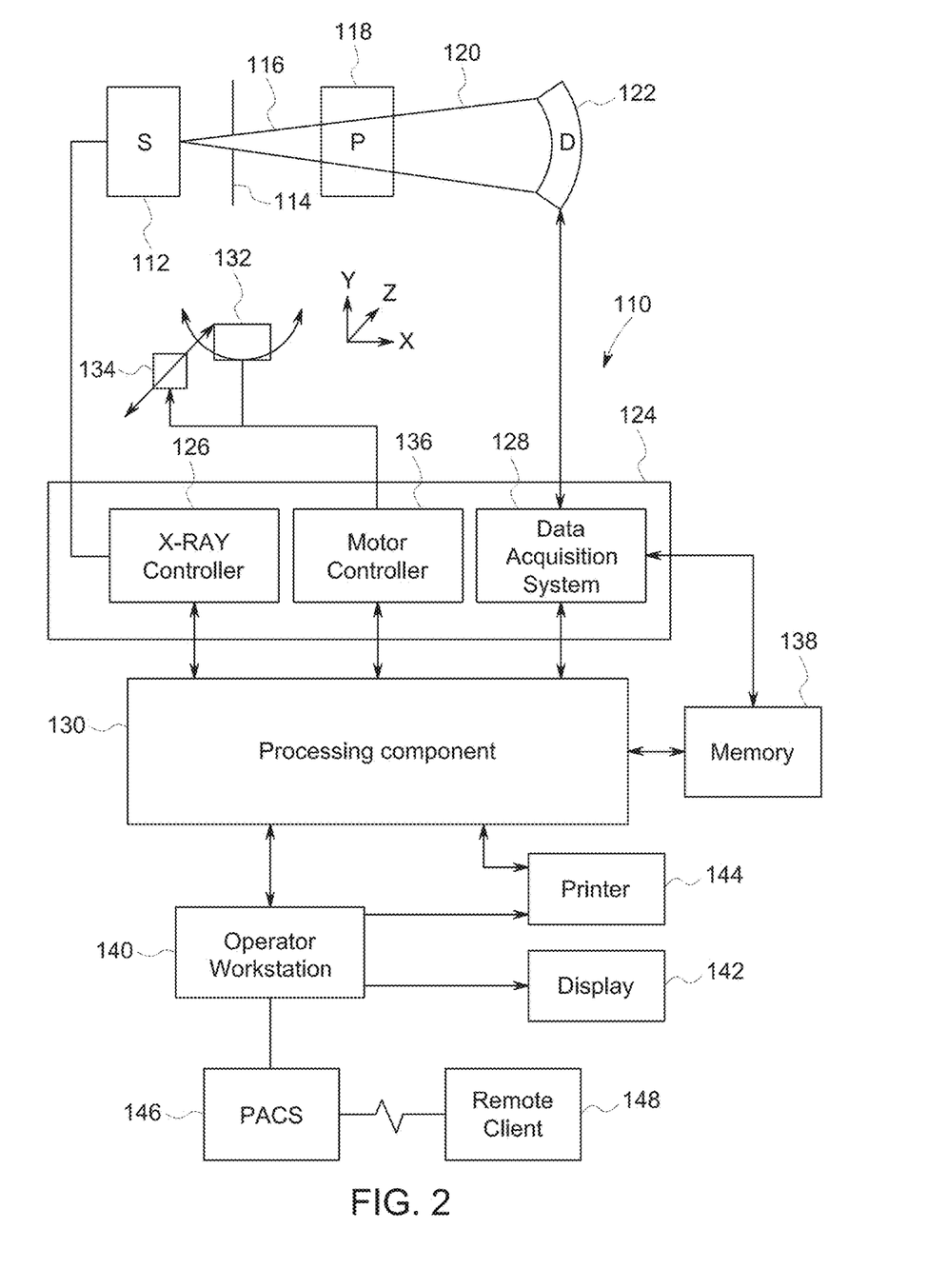
FIG. 2 is a block diagram depicting components of a computed tomography (CT) imaging system, in accordance with aspects of the present disclosure.

With this in mind, an example of an imaging system 110 (i.e., a scanner) is depicted in FIG. 2. In the depicted example, the imaging system 110 is a CT imaging system designed to acquire scan data (e.g., X-ray attenuation data) at a variety of views and energy spectra around a patient (or other subject or object of interest) and suitable for performing image reconstruction using tomographic reconstruction techniques. In the embodiment illustrated in FIG. 2, imaging system 110 includes a source of X-ray radiation 112 positioned adjacent to a collimator 114. The X-ray source 112 may be an X-ray tube, a distributed X-ray source (such as a solid-state or thermionic X-ray source) or any other source of X-ray radiation suitable for the acquisition of medical or other images. In one embodiment, the X-ray source 112 is a dual- or multi-energy X-ray source capable or alternately emitting radiation at two or more energy spectra (e.g., a high- and low-energy spectrum) during an imaging operation so as to obtain multi-spectral X-ray transmission data capable of being processed to derive material or energy-specific image data.

In the depicted example, the collimator 114 shapes or limits a beam of X-rays 116 that passes into a region in which a patient/object 118, is positioned. In the depicted example, the X-rays 116 are collimated to be a cone-shaped or fan-shaped beam that passes through the imaged volume. A portion of the X-ray radiation 120 passes through or around the patient/object 118 (or other subject of interest) and impacts a detector array, represented generally at reference numeral 122. Detector elements of the array produce electrical signals that represent the intensity of the incident X-rays 120. These signals are acquired and processed to reconstruct images of the features within the patient/object 118.

Source 112 is controlled by a system controller 124, which furnishes both power, and control signals for CT examination sequences, including acquisition of two-dimensional localizer or scout images used to identify anatomy of interest within the patient/object for subsequent scan protocols. In the depicted embodiment, the system controller 124 controls the source 112 via an X-ray controller 126 which may be a component of the system controller 124. In such an embodiment, the X-ray controller 126 may be configured to provide power and timing signals to the X-ray source 112.

Moreover, the detector 122 is coupled to the system controller 124, which controls acquisition of the signals generated in the detector 122. In the depicted embodiment, the system controller 124 acquires the signals generated by the detector using a data acquisition system 128. The data acquisition system 128 receives data collected by readout electronics of the detector 122. The data acquisition system 128 may receive sampled analog signals from the detector 122 and convert the data to digital signals for subsequent processing by a processor 130 discussed below. Alternatively, in other embodiments the digital-to-analog conversion may be performed by circuitry provided on the detector 122 itself. The system controller 124 may also execute various signal processing and filtration functions with regard to the acquired image signals, such as for initial adjustment of dynamic ranges, interleaving of digital image data, and so forth.

In the embodiment illustrated in FIG. 2, system controller 124 is coupled to a rotational subsystem 132 and a linear positioning subsystem 134. The rotational subsystem 132 enables the X-ray source 112, collimator 114 and the detector 122 to be rotated one or multiple turns around the patient/object 118, such as rotated primarily in an x,y-plane about the patient. It should be noted that the rotational subsystem 132 might include a gantry or C-arm upon which the respective X-ray emission and detection components are disposed. Thus, in such an embodiment, the system controller 124 may be utilized to operate the gantry or C-arm.

The linear positioning subsystem 134 may enable the patient/object 118, or more specifically a table supporting the patient, to be displaced within the bore of the CT system 110, such as in the z-direction relative to rotation of the gantry. Thus, the table may be linearly moved (in a continuous or step-wise fashion) within the gantry to generate images of particular areas of the patient 118. In the depicted embodiment, the system controller 124 controls the movement of the rotational subsystem 132 and/or the linear positioning subsystem 134 via a motor controller 136.

In general, system controller 124 commands operation of the imaging system 110 (such as via the operation of the source 112, detector 122, and positioning systems described above) to execute examination protocols and to process acquired data. For example, the system controller 124, via the systems and controllers noted above, may rotate a gantry supporting the source 112 and detector 122 about a subject of interest so that X-ray attenuation data may be obtained at one or more views relative to the subject. In the present context, system controller 124 may also include signal processing circuitry, associated memory circuitry for storing programs and routines executed by the computer (such as routines for performing tomographic reconstruction techniques described herein), as well as configuration parameters, image data, and so forth.

In the depicted embodiment, the image signals acquired and processed by the system controller 124 are provided to a processing component 130 for reconstruction of images in accordance with the presently disclosed algorithms. The processing component 130 may be one or more general or application-specific microprocessors. The data collected by the data acquisition system 128 may be transmitted to the processing component 130 directly or after storage in a memory 138. Any type of memory suitable for storing data might be utilized by such an exemplary system 110. For example, the memory 138 may include one or more optical, magnetic, and/or solid state memory storage structures. Moreover, the memory 138 may be located at the acquisition system site and/or may include remote storage devices for storing data, processing parameters, and/or routines for tomographic image reconstruction, as described below.

The processing component 130 may be configured to receive commands and scanning parameters from an operator via an operator workstation 140, typically equipped with a keyboard and/or other input devices. An operator may control the system 110 via the operator workstation 140. Thus, the operator may observe the reconstructed images and/or otherwise operate the system 110 using the operator workstation 140. For example, a display 142 coupled to the operator workstation 140 may be utilized to observe the reconstructed images and to control imaging. Additionally, the images may also be printed by a printer 144 which may be coupled to the operator workstation 140.

Further, the processing component 130 and operator workstation 140 may be coupled to other output devices, which may include standard or special purpose computer monitors and associated processing circuitry. One or more operator workstations 140 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 140 may also be coupled to a picture archiving and communications system (PACS) 146. PACS 146 may in turn be coupled to a remote client 148, radiology department information system (RIS), hospital information system (HIS) or to an internal or external network, so that others at different locations may gain access to the raw or processed image data.

While the preceding discussion has treated the various exemplary components of the imaging system 110 separately, these various components may be provided within a common platform or in interconnected platforms. For example, the processing component 130, memory 138, and operator workstation 140 may be provided collectively as a general or special purpose computer or workstation configured to operate in accordance with the aspects of the present disclosure. In such embodiments, the general or special purpose computer may be provided as a separate component with respect to the data acquisition components of the system 110 or may be provided in a common platform with such components. Likewise, the system controller 124 may be provided as part of such a computer or workstation or as part of a separate system dedicated to image acquisition.

The system of FIG. 2 may be utilized to acquire multi- or dual-energy X-ray projection data (or other scan data for other modalities) for a variety of views about a region of interest of a patient to reconstruct images of the imaged region using the spectral scan data. Projection (or other) data acquired by a system such as the imaging system 110 may be reconstructed as discussed herein to perform a tomographic reconstruction. In particular, the present approach utilizes deep learning techniques to process spectral data acquired by an imaging system, such as that shown in FIG. 2, to segment image regions corresponding to one or more specified materials, such as bone structures. Images may then be generated of the segmented material or free of the segmented material, such as bone-free vascular images or volumes.

Figure 3:
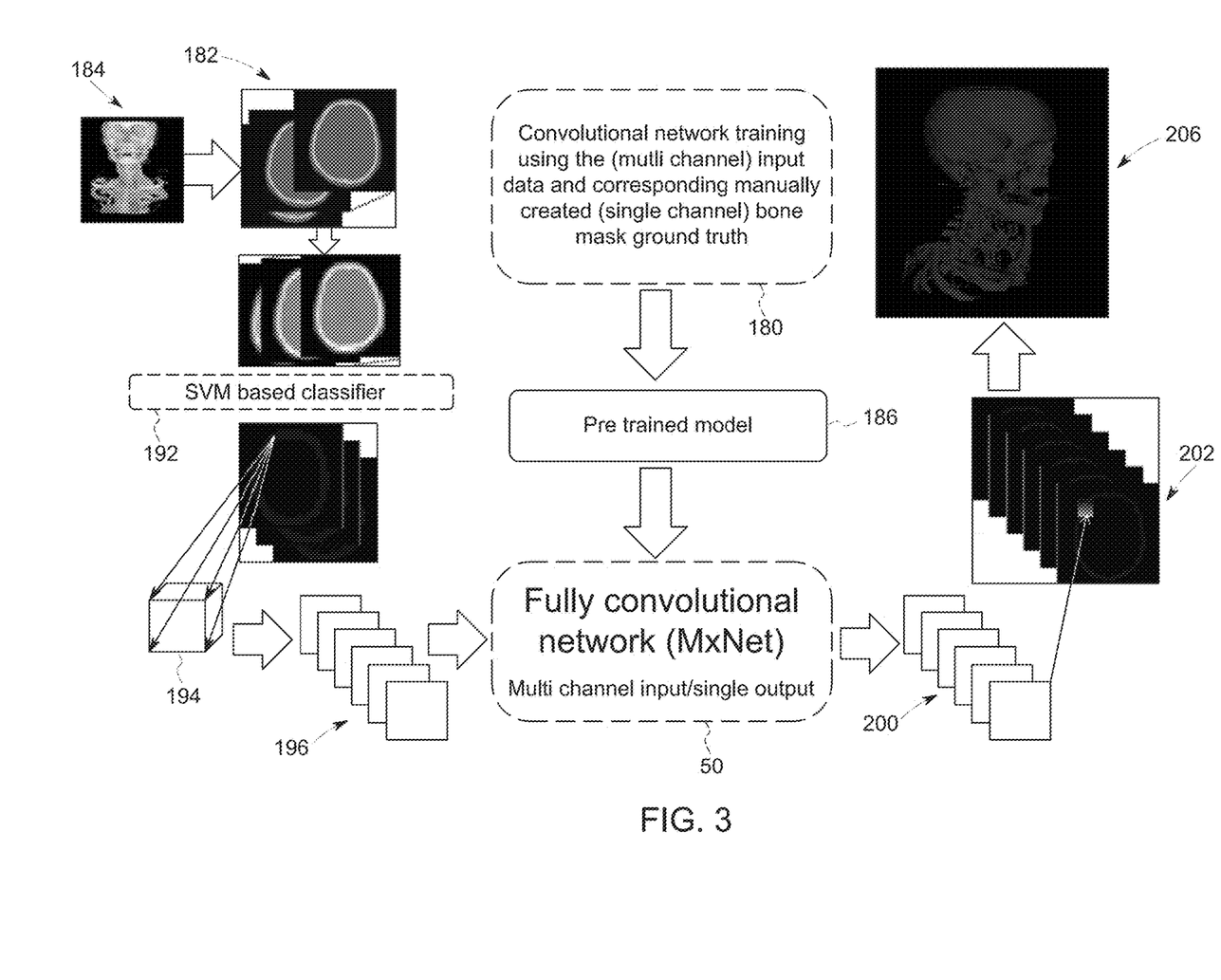
FIG. 3 depicts a work flow of the present approach for bone segmentation, in accordance with aspects of the present disclosure.

With the preceding in mind, and turning to FIG. 3, a sample workflow of the present approach is provided. In this example, a trained neural network 50, as described above, is initially trained (block 180) to generate a tissue model 186 using multi-channel data as input data and corresponding single channel bone masks as the corresponding ground truth images. The multi-channel input aspect of the present approach allows the use of information from more than one channel to be used to learn tissue properties, leading to greater tissue classification specificity. The multi-channel input in this example is from a co-registered multi-channel acquisition, such as a multi-energy acquisition or multi-modality acquisition.

The trained network 50 is a fully convolutional network configured to receive multi-channel inputs and generate a single output from the multiple inputs. With respect to the inputs to the convolutional network, in the depicted example, high-resolution, multi-channel data 182 is derived from a spectral (e.g., multi- or dual-energy) acquisition 184. The high-resolution, multi-channel data 182, in one implementation, is sub-sampled (sub-sampled multichannel data 190) and used to derive support vector machine (SVM) based classifiers 192 (e.g., a feature set). The resulting sub-sampled, multichannel high-resolution three-dimensional (3D) space 194 may be used to derive two-dimensional (2D) slices 196 which are provided as inputs to the trained fully convolutional network 50.

The output of the fully convolutional network are corresponding 2D slices 200 of single channel bone probability masks (i.e., the elements of the slices (e.g., pixels) are corresponding probabilities that the element correspond to or represents bone. The slices may be threshold processed based on a specified threshold probability (e.g., 50%, 75%, 85%, 90%, 95%, and so forth) to derive a series or set of bone masks 202 where each element is assigned as bone or not bone. The resulting 2D slices 202 may then be used to generate a 3D volume 206, i.e., a bone mask or volume, that may be used to exclude bone regions from a vascular tree.

Figure 4:
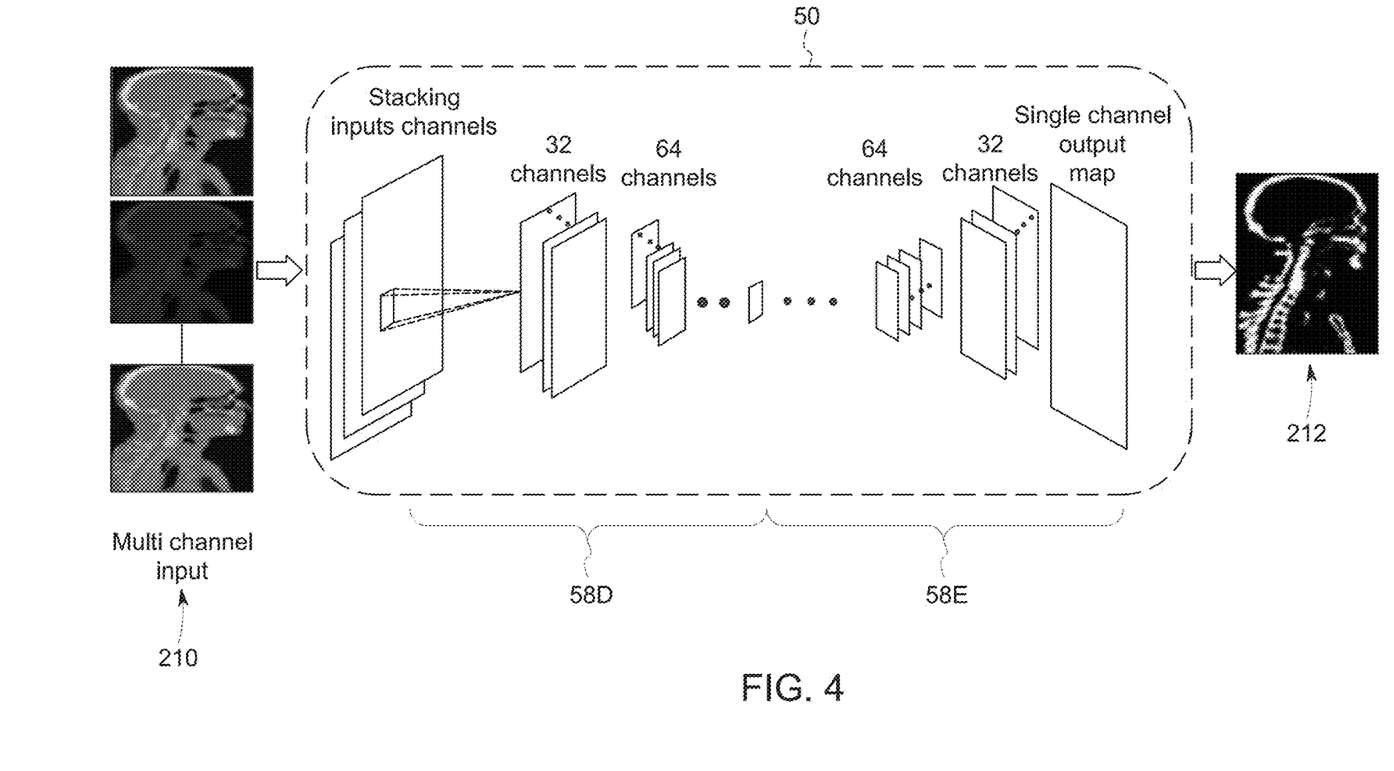
FIG. 4 depicts aspects related to a convolutional neural network for bone segmentation, in accordance with aspects of the present disclosure.

Turning to FIG. 4, additional detail is provided of an example of the convolutional network 50 and corresponding multi-channel inputs and single channel output of one embodiment. In this example, a U-Net deep learning architecture is shown though, as noted above, other suitable deep learning architectures may also be employed. In this example, the convolutional network 50 receives multi-channel inputs 210 in the form of a set of 2D slices or images at different X-ray spectra. Within the neural network itself, multiple downsampling layers 58D and corresponding upsampling layers 58E are provided. The number of filters in layer k equals 32 k. The multiple upsampling and downsampling layers allow for multi-scale tissue classification from a multi-parametric acquisition.

In the depicted example, three downsampling layers 58D and three upsampling layers 58E are provided, with the three illustrated downsampling layers progressively going from a stack of input channels, to 32 channels, to 64 channels and the illustrated upsampling layers progressively going from 64 channels, to 32 channels, to a single channel output map 212, corresponding to a bone image or bone probability map. That is, the final layer of network outputs the bone probability map (on a slice), $P_{fg}(x,y)$. The resulting 2D slices are stacked to obtain the 3D foreground probability map.

Figure 5:
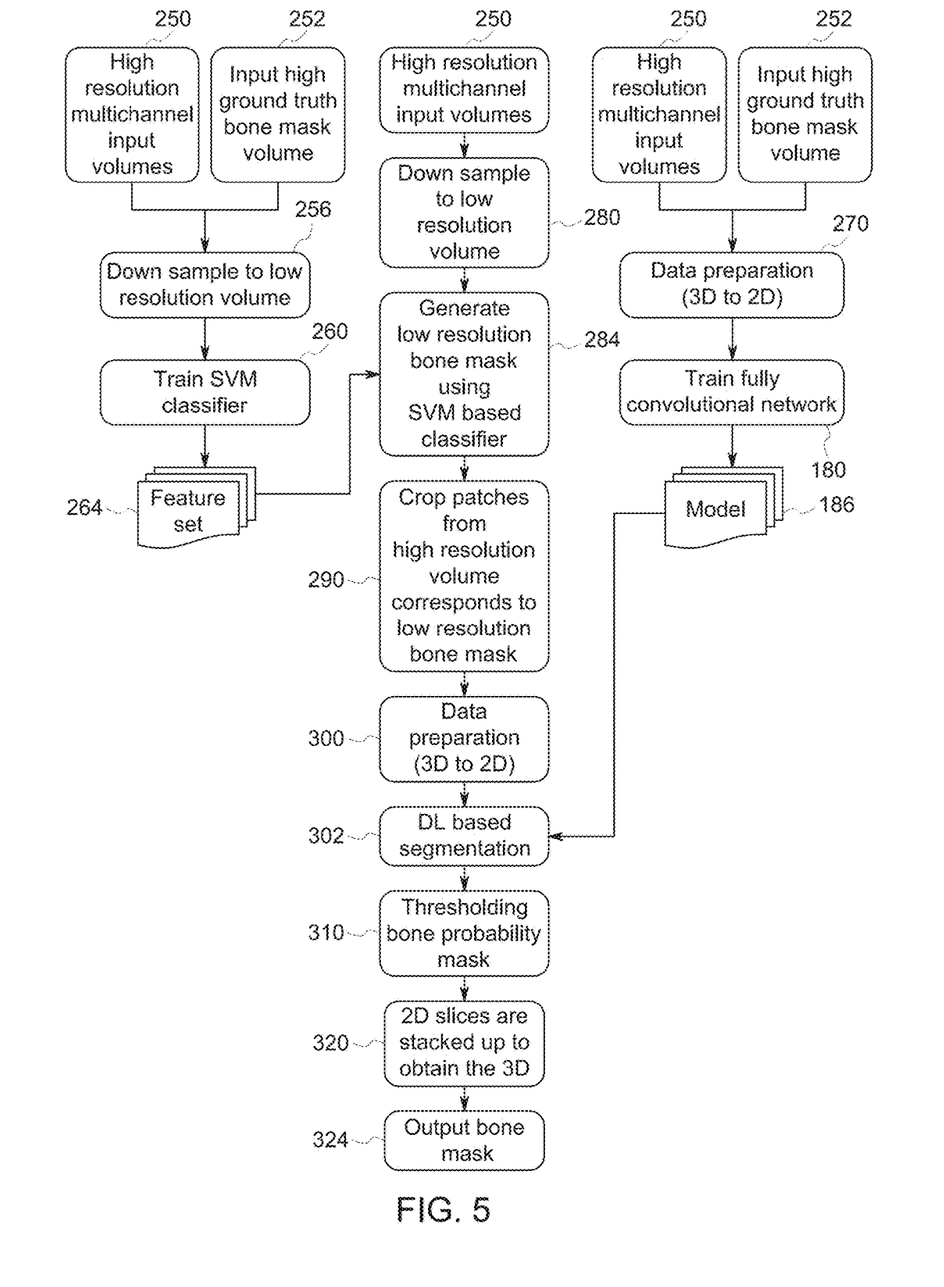
FIG. 5 depicts a flow chart of steps of the present approach for bone segmentation, in accordance with aspects of the present disclosure.

With the preceding in mind, FIG. 5 depicts a flow chart of steps in the training and use of the present approach in a bone segmentation context. The described approach employs a multi-level and a multi-channel framework for segmentation using SVM followed by deep learning as discussed herein.

With this in mind, and turning to the left-hand branch of the flowchart, a low resolution version of the multi-channel data is generated and an SVM classifier with simple features employed to generate a coarser level bone mask. The features used by SVM may include, but are not limited to, minimum, maximum, mean, standard deviation, gradient magnitude, and entropy. In one example, the data is down sampled with a ratio of 32. Depending on the resolution of data set, every voxel in the coarser map corresponds to a volume size of 32×32×32 in the original image resolution.

With this in mind, and turning to the figure details, the left-hand branch of the flow chart depicts high-resolution, multi-channel volumes 250 and an input high ground truth bone mask volume 252 that are initially downsampled (block 256) to one or more lower-resolution volumes. The low-resolution volumes are used to train (block 260) a support vector machine (SVM) classifier. An SVM feature set 264 is thereby derived. The SVM feature set 264 constitutes pre-classified data (i.e., bone/non-bone) and is used to generate an input to the multi-channel input of the trained neural network 50. This is in contrast to using direct images as the input to the neural network 50.

The SVM pre-classified data may be used to reduce the amount of data to be processed for segmentation (such as by cropping out clearly non-bone regions), which may significantly reduce computation time. In particular, the depicted multi-level architecture uses the SVM based classification to reduce the amount of data (by about 10% of the entire volume in certain implementations) to be processed by the subsequent deep learning network step.

Turning to the right-hand branch, high-resolution, multi-channel volumes 250 and input high ground truth bone mask volume 252 undergo a data preparation step in which 2D slices are derived (block 270) from the 3D volumes. The slices are used to train (block 180) a convolutional network 50 as discussed herein, yielding a pre-trained tissue model 186. In one implementation, while training the deep learning network, all possible (bone and non-bone) patches are considered.

With this in mind, and turning to the center branch of the flow chart, the feature set 264 generated using SVM is used to generate a low resolution (i.e., coarse) segmented bone region that is used as an input to deep learning based bone segmentation at the highest resolution. The coarser bone mask is refined at higher resolution (mapping voxels at coarser level to 3D patches in higher resolution as shown in FIG. 3) using Convolution Neural Networks, which are trained a-priori, as described above, using the manually created ground truth. Testing is done only on the patches which are marked as bone based on the SVM generated feature set. The refined patches obtained from the processing by the deep learning network are stacked together to obtain highest resolution bone mask.

This is represented in the central branch of the flowchart of FIG. 5, where the SVM derived feature set 264 and the trained convolutional network based on the model 186 are shown as being used in a cascaded manner to process acquisition data. As shown, high-resolution multichannel input volumes 250 are acquired and downsampled (block 280) to a lower resolution volume. Using the SVM derived feature set 264, the downsampled volume is processed to generate (block 284) a low-resolution bone mask. The low-resolution bone mask is used to crop (block 290) patches from the high-resolution volume that correspond to the low resolution bone mask. The cropped volume is then used to further prepare (block 300) the data, generating 2D slices from the 3D volume. The 2D slices are processed using the trained convolution network (block 302) to perform a deep learning based segmentation within the slices.

As noted above, the output of the trained network is 2D single channel, bone-probability maps. The probability maps are thresholded (block 310) to obtain 2D slices in which pixels are classified as bone (and having a first intensity, such as 1) or not bone (having a second intensity, such as 0). The resulting threshold slices are stacked (block 320) to obtain the 3D bone mask volume, which may then be output (block 324) either for display or for use in generating a bone-free volume, such as a bone-free vascular tree. A may be appreciated, the deep learning aspects of the present approach use multi-dimensional features, which help to effectively resolve ambiguity and, and to do so faster, than in conventional t segmentation algorithms.

Technical effects of the invention include a multi-level and a multi-channel frame work for segmentation using SVM followed by deep learning. This framework starts with a very low resolution version of the multi-channel data and constructs an SVM classifier with simple features to generate a coarser level bone mask that in turn is used to crop patches from the high-resolution volume. The cropped volume is then used to further prepare the data, generating 2D slices from the 3D volume. The 2D slices are processed using the trained convolution network to perform a deep learning based segmentation within the slices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A method, comprising:
obtaining high resolution multi-channel measurement data from a medical imaging scanner;
downsampling high resolution multi-channel measurement data to a low resolution volume;
using a model based or shadow classification to generate a low resolution tissue mask from the low resolution volume;
cropping patches from high resolution multi-channel measurement data corresponding to the low resolution tissue mask;
generating 2D slices from the cropped patches;
processing 2D slices using a trained neural network, wherein the trained neural network outputs a set of two-dimensional or higher dimensional single-channel tissue maps;
generating a tissue mask using the set of single-channel tissue maps; and
displaying the tissue mask or a tissue-free volume derived using the tissue mask.

2. The method of claim 1, wherein the tissue map comprises a bone map and the tissue mask comprises a bone mask.

3. The method of claim 1, wherein the high resolution multi-channel measurement data comprises dual-energy or higher energy simultaneously acquired or co-registered measurement data.

4. The method of claim 1, wherein the single-channel tissue maps comprise tissue probability maps and generating the tissue mask comprises:
threshold processing the tissue probability maps to generate the tissue mask slices and/or volume.

5. The method of claim 1, wherein the trained neural network comprises a plurality of downsampling layers and a corresponding plurality of upsampling layers.

6. The method of claim 1, wherein the high resolution multi-channel measurement data is co-registered.

7. An image processing system comprising:
a processor configured to execute one or more stored processor-executable routines; and
a memory storing the one or more executable-routines, wherein the one or more executable routines, when executed by the processor, cause acts to be performed comprising:
obtaining high resolution multi-channel measurement data from one or more medical imaging scanners;
downsampling high resolution multi-channel measurement data to a low resolution volume;
using a model based or shadow classification to generate a low resolution tissue mask from the low resolution volume;
cropping patches from high resolution multi-channel measurement data corresponding to the low resolution tissue mask;
generating 2D slices from the cropped patches;
processing 2D slices using a trained neural network, wherein the trained neural network outputs a set of two or more-dimensional single-channel tissue maps;
generating a tissue mask using the set of single-channel tissue maps; and
displaying the tissue mask or a target tissue-free volume derived using the tissue mask.

8. The image processing system of claim 7, wherein the high resolution multi-channel measurement data comprises dual-energy, multi-energy or multi-modality measurement data.

9. The image processing system of claim 7, wherein the tissue map comprises a bone map and the tissue mask comprises a bone mask.

10. The image processing system of claim 7, wherein the single-channel tissue maps comprise tissue probability maps and generating the tissue mask comprises:
threshold processing the tissue probability maps to generate a set of tissue mask images.

11. The image processing system of claim 7, wherein the trained neural network comprises a plurality of downsampling layers and a corresponding plurality of upsampling layers.

12. One or more non-transitory computer-readable media encoding processor-executable routines, wherein the routines, when executed by a processor, cause acts to be performed comprising:

obtaining high resolution multi-channel measurement data from one or more medical imaging scanners;

downsampling high resolution multi-channel measurement data to a low resolution volume;

using a model based or shadow classification to generate a low resolution tissue mask from the low resolution volume;

cropping patches from high resolution multi-channel measurement data corresponding to the low resolution tissue mask;

generating 2D slices from the cropped patches;

processing 2D slices using a trained neural network, wherein the trained neural network outputs a set of two- or higher dimensional single-channel tissue maps;

generating a tissue mask using the set of single-channel tissue maps; and     displaying the tissue mask or a tissue-free volume derived using the tissue mask.

13. The one or more non-transitory computer-readable media of claim 12, wherein the high resolution multi-channel measurement data comprises dual- or multi-energy or multi-modal measurement data.

14. The one or more non-transitory computer-readable media of claim 12, wherein the two- or higher dimensional single-channel tissue maps comprise tissue probability maps and generating the tissue mask comprises:

processing of the tissue probability maps to generate a set of tissue mask images.

* * * * *